G. T. BUXTON & S. A. ABBEY.
FILTER SCREEN.
APPLICATION FILED APR. 10, 1917.
1,254,025.
Patented Jan. 22, 1918.
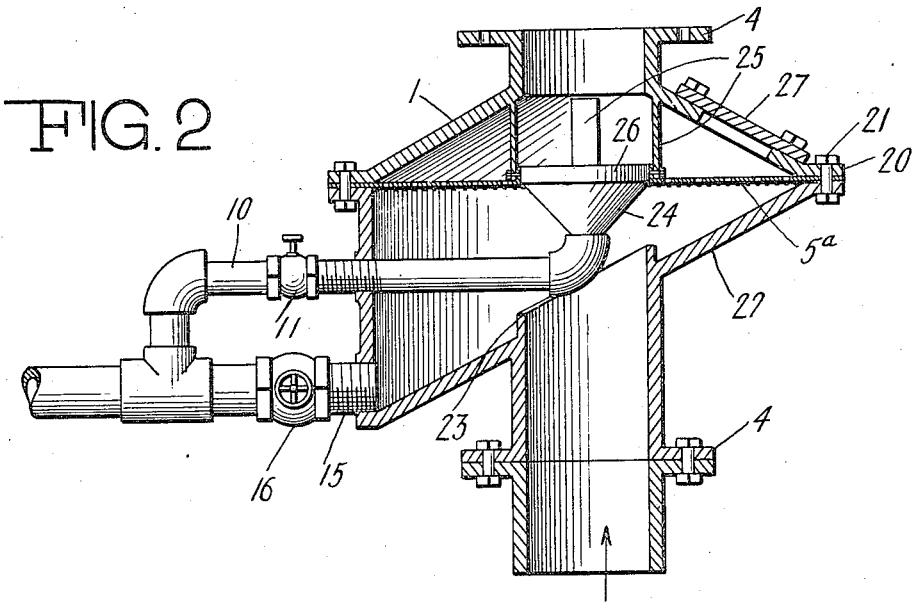
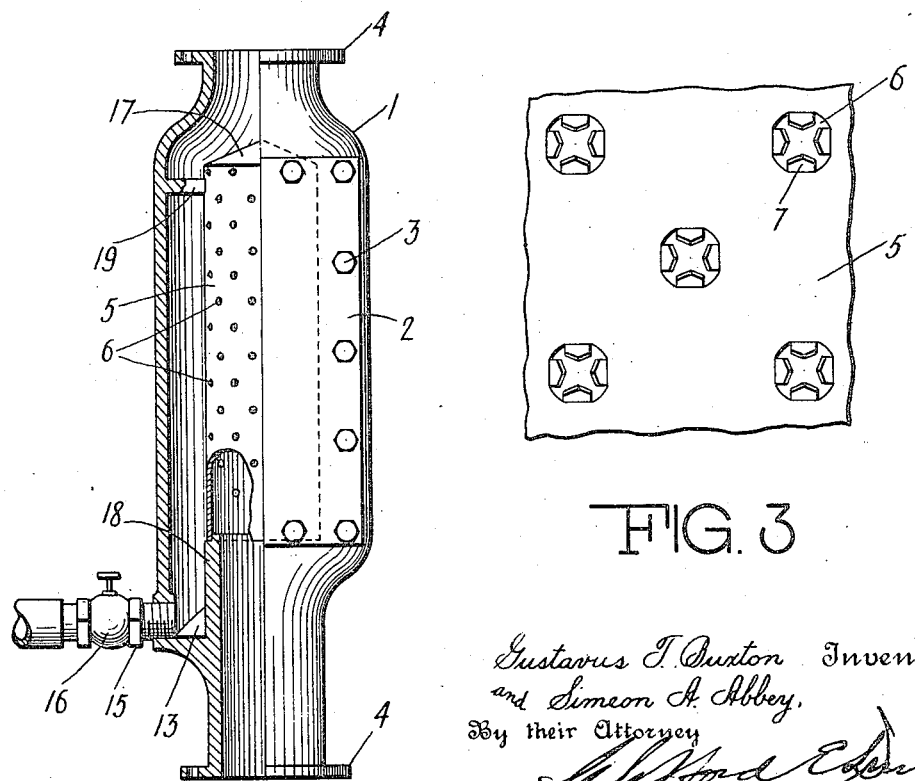

UNITED STATES PATENT OFFICE.

GUSTAVUS T. BUXTON AND SIMEON A. ABBEY, OF CHARLOTTE, NORTH CAROLINA.

FILTER-SCREEN.

1,254,025.  Specification of Letters Patent.  Patented Jan. 22, 1918.

Original application filed July 23, 1915, Serial No. 41,472. Divided and this application filed April 10, 1917. Serial No. 161,034.

*To all whom it may concern:*

Be it known that we, GUSTAVUS T. BUXTON and SIMEON A. ABBEY, citizens of the United States, residing in Charlotte, in the county of Mecklenburg and State of North Carolina, have invented certain new and useful Improvements in Filter-Screens, of which the following, taken in connection with the accompanying sheets of drawings, is a full, clear, and concise description thereof.

This invention is a division of a joint copending application of Gustavus T. Buxton and Simeon A. Abbey, filed July 23rd, 1915, Serial No. 41,472, filtration devices for fluid distributing systems, and relates particularly to a form of filter screen which is applicable to filtering devices of the type shown therein.

The object of our invention is to safeguard the main supply pipes or risers of automatic sprinklers or like apparatus against the collection of foreign substances—such as gravel, cinders, mud, etc.

A special object of the invention is the provision of a filter screen highly efficient and characterized by simplicity of construction.

In the accompanying drawings we have illustrated several embodiments of our invention to show the manner in which the same may be usefully employed, and in which—

Figure 1 is a view in side elevation, partly in section, of a vertical filter embodying one form of our invention in which the screen cylinder is arranged vertically and in which the fluid flow is in an upward direction.

Fig. 2 is a vertical section of a modification of our invention showing a form of horizontal strainer applied in lieu of the vertically arranged cylindrical strainer of Fig. 1; and Fig. 3 is a fragmentary detail of a portion of the filter screen showing the manner in which the openings therethrough are guarded to prevent their obstruction or entrance by foreign substances of the system.

Our filter screen comprises part of a filter body to be inserted in the main pipe or riser supplying a water system. In connection with the embodiment illustrated in Fig. 1, the water enters the filter through the bottom orifice flowing up therethrough and after being filtered is distributed through the system. During its passage through the filter the more solid substances, which are not capable of finding their way through the guarded openings in the screen, are arrested and deposited in the device to be subsequently removed therefrom. The filter comprises a shell or casing 1 having a side opening covered by a removable plate or door 2, whereby access may be conveniently had to the interior by the removal of retaining bolts 3. The shell is provided with end flanges 4 adapted to connect with the flanged ends of the main supply pipes in which the filter is to be inserted. The interior diameter of the filter is preferably twice the size of the fluid supply pipe leading to the system which is to be protected. Disposed centrally within the shell or casing is arranged a filter screen which may take the form of a vertical cylinder 5, in Fig. 1, or a flat circular longitudinally arranged screen 5$^a$ in Fig. 2. This filter screen is provided with perforations or apertures 6 throughout the major portion of its body, these apertures being guarded by a plurality of outwardly extending fingers or projections 7, which are preferably stamped from the metal of which the screen is made, and preferably each of the fingers is of a length corresponding to half the diameter of the aperture which it guards, and are formed in pairs opposing each other. The end of each of the fingers terminates in a point with the adjacent sides forming an obtuse angle. As explained, these guard fingers extend outwardly in contrary direction to the flow of the fluid through the aperture, and are for the purpose of protecting and shielding the system from such solids as may be carried by the fluid supply that are not able to pass through the restricted openings or apertures. The outwardly projecting fingers with their sides and terminating points form cam surfaces for the apertures 6 to cam off any obstructions that might be directed toward the apertures, and since but a short portion of the periphery of the apertures is disposed between them, the obstructions can in no way, when cammed off, be brought down to obstruct any part of the apertures. A particular advantage of having these guard fingers extending outwardly opposite to the direction of the incoming fluid is that they render it impossible for substances to become wedged in the apertures, which might be the case if the guard fingers extended inwardly, that is, in the direction of the flow. By reason of this particular arrangement and shape of guard fingers, substances which might be arrested thereby will not necessarily obstruct the inward flow of fluid, as such substances will be arrested and held removed from the body proper of the screen, while the fluid flows around and through the remaining space beneath, between the adjacent guard fingers without affecting the normal flow of the fluid through the openings. The perforated screen is preferably made of brass and is of a diameter slightly in excess of that of the pipe or fluid inlet, and is of such length and possesses sufficient guarded apertures to afford in the aggregate an area of at least four times that of the fluid inlet pipe.

In embodying the invention in a filter which is designed to protect a system where the flow in the entrance pipe is in an upward direction, the cylindrical filter screen and containing shell is preferably made in accordance with the illustration of Fig. 1, in which the filter screen 5 is closed at the top by tapering top member 17. In this form of filter the screen 5 is supported vertically and centrally within the casing 1, the upper end thereof being fastened by a plurality of inwardly projecting lugs 19 formed of the shell 1 and the door 2. The top of the filter is closed by a tapering top member 17. The lower opening of the filter is supported upon a circumferentially arranged upwardly projecting wall 18, having provided at its exterior base an inclined bottom 13, said wall and bottom comprising a deposit channel or groove circumferentially around the inside of the chamber and outside of the entrance inlet thereto. At the lowest point of this channel or groove the shell 1 is provided with an aperture to which is connected an outlet drain pipe 15 which is controlled by a suitable valve 16.

We may, where found desirable, substitute for a cylindrical filter screen a horizontally arranged filter screen as shown at 5ª, in Fig. 2. When so doing, we preferably change the shape of the containing chamber to that shown in said Fig. 2. The screen here is supported in position between projecting flanges 20 of the two-part casing illustrated by securing bolts 21 arranged circumferentially thereof for the purpose. The bottom 22 of the casing here illustrated is inclined and the incoming pipe is provided with an annular projection 23. In this form of apparatus a coniform or funnel-shaped sediment depositing pocket 24 is employed to which may be connected the drain pipe 10 controlled by a suitable valve 11, while the drain pipe 15 may also be connected at the lower end of the device, so as to take care of the deposits therein. The funnel-shaped mud pocket and screen are supported centrally of the apparatus by suitable depending arms 25 and collar 26, the former of which may, if desired, be cast integral with the casing 1. In this form of apparatus, a suitable opening protected by a door 27 is provided to afford access to both sides of the filter screen for inspection or other purposes.

The incoming flow is in the direction of the arrow and the earthy materials or solids that are carried thereby are trapped and separated therefrom so that the same may enter the system in as purified a state as possible. It will be understood that the speed of the flow, as it enters the filter slackens owing to the fact that its area is larger than the inlet pipe and, consequently there exists a tendency of the solids to separate and descend by gravity into the groove at the bottom of the apparatus. If the flow, however, is of sufficient speed to lift the materials that are heavier than the fluid against the guards, they will there be arrested and held, leaving the apertures between the guard fingers open. When the pressure occasioned by the flow slackens, the solids will drop by gravity into the groove or channel and be there retained until the valve connecting the drain pipe is opened, when they will be expelled by the rush of water therethrough.

It will be understood that ordinarily most of such obstacles will be deposited in this groove without coming in contact with the filter screen, as the groove affords a recess into which they may drop immediately upon entrance.

Most of the material in solution with the water will be carried through the filter screen into the pipe. After the water becomes stationary upon the filling of the pipes, this material precipitates and causes a slight deposit of sediment therein. The funnel or mud pocket provided will collect a considerable portion of this as the area contained in the large vertical pipe with which it is usually connected, forms a large percentage of the entire pipe area of the system.

When it is desired to clean the filter, all that is necessary to do is to open the valves 11 and 16 controlling the drains in the bottom of the inclined channel, and the bottom of the mud pocket. In this manner the water pressure from above will eject the same from the filter.

By shutting off the fluid supply and opening the valve 16 of the drain pipe 15, the water from the system above will pass down through the filter screen and be discharged. This outward flow will tend to throw off any obstruction which may have lodged or been caught by the screen guards, thus ejecting the same from the system. It is understood that in the event of the drain from the inclined channel at the bottom of the device or mud pocket failing to clear when the controlling valves of the drains are opened, access to the interior of the device may be readily had by removing the door or cover 2. Likewise should it be desired to repair or remove the screen, this may be done through the openings provided for the purpose. By the employment of our invention a testing for sediment is made extremely convenient.

Having thus described our invention what we claim as new and desire to secure by Letters Patent is:—

1. As a new article of manufacture, a filter screen provided with apertures formed in the body thereof, each aperture having a plurality of guards projecting outwardly from the edge thereof with but short portions of the edge of such aperture disposed between such guards, said guards extending at an angle to the plane of said screen to form cam surfaces to deflect any obstructions directed at such aperture and prevent the deflected obstructions from obstructing any part of the aperture.

2. As a new article of manufacture, a filter screen provided with apertures formed in the body thereof, each aperture having a plurality of guards projecting outwardly therefrom with but short portions of the edge of an aperture disposed between such guards, the guards terminating in points with the adjacent sides forming obtuse angles, said guards with their points forming cam surfaces to deflect any obstructions directed at such apertures and prevent the deflected obstructions from obstructing any part of the aperture.

GUSTAVUS T. BUXTON.
SIMEON A. ABBEY.

Copies of this patent may be obtained for five cents each, by addressing the "Commissioner of Patents, Washington, D. C."